(12) United States Patent
Zhang et al.

(10) Patent No.: US 9,523,811 B2
(45) Date of Patent: Dec. 20, 2016

(54) DISPLAY SCREEN AND METHOD FOR MANUFACTURING THE SAME

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Wenhao Zhang, Beijing (CN); Yuting Yang, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 37 days.

(21) Appl. No.: 14/421,883

(22) PCT Filed: Jul. 29, 2014

(86) PCT No.: PCT/CN2014/083177
§ 371 (c)(1),
(2) Date: Feb. 16, 2015

(87) PCT Pub. No.: WO2015/085776
PCT Pub. Date: Jun. 18, 2015

(65) Prior Publication Data
US 2016/0054511 A1  Feb. 25, 2016

(30) Foreign Application Priority Data
Dec. 12, 2013  (CN) .......................... 2013 1 0683028

(51) Int. Cl.
*G02F 1/1335* (2006.01)
*F21V 8/00* (2006.01)
(Continued)

(52) U.S. Cl.
CPC ........... *G02B 6/0066* (2013.01); *G02B 6/0051* (2013.01); *G02B 6/0053* (2013.01); *G02B 6/0055* (2013.01);
(Continued)

(58) Field of Classification Search
CPC ................... G02F 1/133615; G02F 1/133603; G02F 1/133604; G02F 1/133608; G02F 2001/100607; G02F 1/133606; G02B 6/0038; G02B 6/0063; G02B 6/0068
(Continued)

(56) References Cited

U.S. PATENT DOCUMENTS 6,707,519 B1 * 3/2004 Okumura .......... G02F 1/133555
349/112
7,528,915 B2 * 5/2009 Choi ...................... G02B 6/005
349/122
(Continued)

FOREIGN PATENT DOCUMENTS

CN  200200815 U  * 11/2012 ................ G02F 1/13
CN  202522815 U    11/2012
(Continued)

OTHER PUBLICATIONS

Office Action in Chinese Patent Application No. 201310683028.5, dated Aug. 28, 2015.
(Continued)

*Primary Examiner* — Mike Qi
(74) *Attorney, Agent, or Firm* — BakerHostetler LLP

(57) ABSTRACT

Provided are display screen and method for manufacturing the same. The display screen includes a first substrate, a second substrate and a liquid crystal layer arranged between the first substrate and the second substrate; the first substrate includes a base substrate, an optical module arranged on the base substrate, and a plurality of pixel units directly arranged on the optical module; and the second substrate includes an array substrate.

17 Claims, 2 Drawing Sheets

(51) Int. Cl.
*G02F 1/1333* (2006.01)
*G02F 1/1337* (2006.01)
*G02F 1/1343* (2006.01)

(52) U.S. Cl.
CPC .......... *G02F 1/1333* (2013.01); *G02F 1/1335* (2013.01); *G02F 1/1337* (2013.01); *G02F 1/13439* (2013.01); *G02F 1/133514* (2013.01); *G02F 1/133516* (2013.01); *G02F 1/133528* (2013.01); *G02F 1/133553* (2013.01); *G02F 1/133606* (2013.01); *G02F 1/134309* (2013.01); *G02F 2001/133368* (2013.01)

(58) Field of Classification Search
USPC .......................................... 349/61, 62, 64, 65
See application file for complete search history.

(56) References Cited

U.S. PATENT DOCUMENTS

| | | | | |
|---|---|---|---|---|
| 7,651,257 | B2* | 1/2010 | Shin | G02F 1/133608 349/58 |
| 2002/0024484 | A1* | 2/2002 | Lee | G09G 3/3655 345/87 |
| 2005/0243238 | A1* | 11/2005 | Cha | G02B 6/0088 349/58 |
| 2007/0195235 | A1 | 8/2007 | Chang et al. | |
| 2008/0212305 | A1* | 9/2008 | Kawana | C09B 67/0033 362/84 |
| 2015/0346418 | A1* | 12/2015 | Chen | G02F 1/133528 349/65 |

FOREIGN PATENT DOCUMENTS

| | | | | |
|---|---|---|---|---|
| CN | 202972780 U | | 6/2013 | |
| CN | 103293763 A | * | 9/2013 | ............ G02F 1/133 |
| CN | 103676276 A | | 3/2014 | |

OTHER PUBLICATIONS

International Search Report and Written Opinion in PCT International Application No. PCT/CN2014/083177, dated October 27, 2014.

* cited by examiner

DISPLAY SCREEN AND METHOD FOR MANUFACTURING THE SAME

CROSS-REFERENCE TO RELATED APPLICATION

This application is the U.S. national phase of PCT Application No. PCT/CN2014/083177 filed on Jul. 29, 2014, which claims a priority to Chinese Patent Application No. 201310683028.5 filed on Dec. 12, 2013, the disclosures of which are incorporated in their entirety by reference herein.

TECHNICAL FIELD

The present disclosure relates to the field of display technology, in particular to a display screen and a method for manufacturing the same.

BACKGROUND

In a thin film transistor-liquid crystal display (TFT-LCD), a back light unit is very important for display. The back light unit is a kind of light source located at the back of the liquid crystal display (LCD). As the LCD does not emit lights itself, a pattern or a character displayed by the LCD is a result of a modulation on lights emitted from the back light unit by the LDC.

In the related art, the back light unit is arranged outside the liquid crystal display panel, which not only increases a thickness of an integral liquid crystal display module, but also generates a scanning line resulting from TFT characteristics changes during illumination.

SUMMARY

The present disclosure mainly aims to provide a display screen and a method for manufacturing the same, to achieve an integration of a back light unit and a display panel, and reduce a thickness of the display module.

In order to achieve the above object, the present disclosure provides a display screen, which includes: a first substrate, a second substrate and a liquid crystal layer arranged between the first substrate and the second substrate;
the first substrate includes: a base substrate, an optical module arranged on the base substrate, and a plurality of pixel units directly arranged on the optical module;
the second substrate includes: an array substrate.

In an example, the second substrate further includes: an over coating covering the array substrate, and a color filter layer arranged on the over coating.

In an example, a first polarizing film layer is arranged on the color filter layer;

In an example, the first substrate further includes:
a second polarizing film layer arranged on the optical module, wherein the second polarizing film layer has a polarizing angle matching with that of the first polarizing film layer.

In an example, the first substrate further includes: an alignment film layer arranged on the second polarizing film layer, wherein the alignment film layer is aligned in accordance with a pretilt angle of a predetermined liquid crystal.

In an example, the optical module includes:
a light guide plate arranged on the base substrate;
a prism film layer arranged on the light guide plate, wherein the prism film layer is provided with a ribbing; and
a diffusing film layer arranged on the prism film layer.

In an example, the light guide plate includes:
a reflection layer formed on the base substrate;
an indium tin oxide (ITO) layer formed on the reflection layer, wherein an etching hole is formed at a position of a lattice point in the ITO layer; and
a light guide film layer coated on the ITO layer, wherein a lattice structure is formed by the light guide film layer in the etching hole of the ITO layer, the light guide film layer has a flat surface.

In an example, the optical module includes:
a reflection layer arranged on the base substrate;
a lower electrode layer arranged on the reflection layer;
a planar organic light emitting diode (OLED) light emitting layer arranged on the lower electrode layer;
an upper electrode layer arranged on the planar OLED light emitting layer;
a prism film layer arranged on the upper electrode layer, wherein the prism film layer is provided with a ribbing;
a diffusing film layer arranged on the prism film layer; and
an antireflection film layer arranged on the diffusing film layer.

In an example, a light bar is provided at a predetermined position of the base substrate.

The present disclosure further provides a method for manufacturing a display screen, which includes:
a step for manufacturing a first substrate: arranging an optical module on a base substrate, directly arranging a plurality of pixel units on the optical module, so as to form the first substrate;
a step for manufacturing a second substrate: forming the second substrate, wherein the second substrate comprises an array substrate;
a step for forming a cell: arranging a liquid crystal layer between the first substrate and the second substrate, arranging the first substrate and the second substrate oppositely to form the cell, so as to form the display screen.

In an example, the step for manufacturing the second substrate further includes:
covering the array substrate with an over coating;
arranging a color filter layer on the over coating.

In an example, the step for manufacturing the second substrate further includes: arranging a first polarizing film layer on the color filter layer.

In an example, the step for manufacturing the first substrate further includes:
arranging a second polarizing film layer on the optical module, wherein the second polarizing film layer has a polarizing angle matching with that of the first polarizing film layer.

In an example, the step for manufacturing the first substrate further includes: arranging an alignment film layer on the second polarizing film layer, aligning the alignment film layer in accordance with a pretilt angle of a predetermined liquid crystal.

In an example, in the step for manufacturing the first substrate, the step for arranging the optical module on the base substrate further includes:
arranging a light guide plate on the base substrate;
arranging a prism film layer on the light guide plate, wherein the prism film is provided with a ribbing by being exposed and developed; and
arranging a diffusing film layer on the prism film layer.

In an example, the step for arranging the light guide plate on the base substrate further includes:

forming a reflection layer on the base substrate;
forming an ITO layer on the reflection layer, and etching the ITO layer at a position of a lattice point using a lattice mask of the light guide plate, to form an etching hole;
coating a light guide film layer on the ITO layer, so that a lattice structure is formed by the light guide film layer in the etching hole of the ITO layer, reserving a position where a linear light source is attached on a light incident side of the light guide film layer, flatting the surface of the light guide film layer by a laser treatment.

In an example, in the step for manufacturing the first substrate, the step for arranging the optical module on the base substrate further includes:
arranging a reflection layer on the base substrate;
arranging a lower electrode layer on the reflection layer;
arranging a planar organic light emitting diode (OLED) light emitting layer on the lower electrode layer;
arranging an upper electrode layer on the planar OLED light emitting layer;
arranging a prism film layer on the upper electrode layer, wherein the prism film layer is provided with a ribbing by being exposed and developed; and
arranging a diffusing layer on the prism film layer; and
arranging an antireflection film layer on the diffusing film layer.

In an example, in the step for manufacturing the first substrate, a light bar is provided at a predetermined position of the base substrate.

Comparing with the related art, the display screen and the method for manufacturing the same according embodiments of the present disclosure, the optical module is arranged on the substrate so as to form the first substrate, the second substrate which includes the array substrate is arranged, and then the first substrate and the second substrate are arranged oppositely to form a cell, so as to form the display screen. The integration of the back light unit and the display panel is finally achieved, which reduce the thickness of the display module.

DETAILED DESCRIPTION

Figure 1:
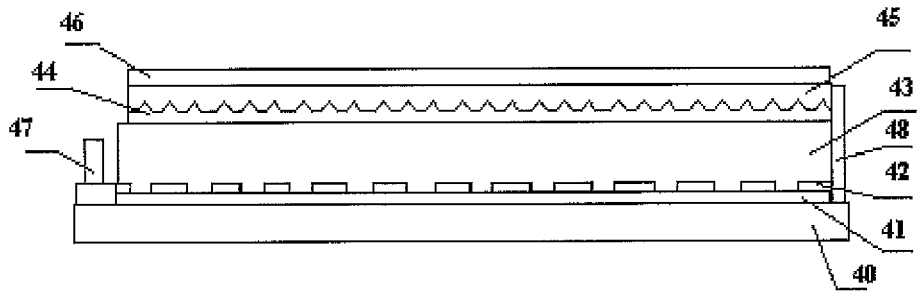
FIG. 1 is a schematic diagram showing a cross-section of a first substrate included in a display screen according to an embodiment of the present disclosure.

Embodiments of the present disclosure are described in details in conjunction with drawings, however, the present disclosure can be implemented by various different means defined and covered by the claims.

The display screen according to an embodiment of the present disclosure includes a first substrate, a second substrate and a liquid crystal layer arranged between the first substrate and the second substrate;
the first substrate includes a base substrate, an optical module arranged on the base substrate, and a plurality of pixel units directly arranged on the optical module;
the second substrate includes an array substrate.

The display screen according to an embodiment of the present disclosure directly integrates BLU (Back Light Unit) onto the first substrate inside the display screen by taking BLU as an optical module, which reduces integral thickness and weight of the display screen.

In the display screen according to an embodiment of the present disclosure, the second substrate further includes: an over coating covering the array substrate, and a color filter layer arranged on the over coating. Then, a top-side of a TFT arranged on the array substrate is covered by a CF (color filter) layer, which may effectively avoid an influence on TFT characteristics by illumination, avoid generating bad scanning lines.

The display screen according to embodiments of the present disclosure, by means of directly arranging the CF (color filter) layer on the array substrate to form the second substrate (also known as color filter array substrate in the present embodiment), and arranging the optical film layer at the other side of the base substrate to form the first substrate (also known as a back light substrate), then arranging the color filter array substrate and the back light substrate oppositely to form a cell, so as to form the liquid crystal display screen, the integration of the back light unit and the liquid crystal panel is achieved, and in the display screen according to the present disclosure, array lines and color filter layer are located at same side, the array lines are completely covered by the color film layer, and the scanning lines resulting from TFT characteristics changes caused by illumination can be avoided, at the thickness of the integral module may be reduced by the integration design.

Alternatively, the color filter layer is provided with a first polarizing film layer.
The first substrate further includes:
a second polarizing film layer arranged on the optical module, wherein the second polarizing film layer has a polarizing angle matching with that of the first polarizing film layer; and
an alignment film layer arrange on the second polarizing film layer, wherein the alignment film layer is aligned in accordance with a pretilt angle of a predetermined liquid crystal.

In a specific embodiment, the optical module includes:
a light guide plate arranged on the base substrate;
a prism film layer arranged on the light guide plate, wherein the prism film layer is provided with a ribbing, for example, the prism film layer is provided with the ribbing by being exposed and developed; and
a diffusing film layer arranged on the prism film layer.

The light guide plate includes:
a reflection layer formed on the base substrate;
an indium tin oxide (ITO) layer formed on the reflection layer, wherein an etching hole is formed at a position of a lattice point in the ITO layer, for example, the etching hole may be formed using a lattice mask of the light guide plate (LGP); and
a light guide film layer coated on the ITO layer, wherein a lattice structure is formed by the light guide film layer in the etching hole of the ITO layer, the light guide film layer has a flat surface.

In such embodiment, a surface of the light guide film layer is required to have lattice point for converging light, in order to form the lattice structure, ITO is etched to from a lattice hole firstly, then when manufacturing the light guide film layer in the next step, a material of the light guide film layer is directly filled into the lattice hole to form the lattice point. The lattice point in the light guide film layer is formed by: firstly etching the ITO layer to form a lattice hole, and then when depositing the light guide film layer, filling the material of the light guide film layer into the lattice hole, so as to form the light guide film layer having the lattice points. In which, an exiting direction of light may be adjusted using the reflection layer, so that the light exit from the front side. The uniformity of the light maybe improved using the diffusing film layer.

In an embodiment, the optical module includes:
a reflection layer arranged on the base substrate;
a lower electrode layer arranged on the reflection layer;
a planar OLED (organic light emitting diode) light emitting layer arranged on the lower electrode layer;
an upper electrode layer arranged on the planar OLED light emitting layer;
a prism film layer arranged on the upper electrode layer, wherein the prism film layer is provided with a ribbing by being exposed and developed;
a diffusing film layer arranged on the prism film layer; and
an antireflection film layer arranged on the diffusing film layer.

In a specific embodiment, the second substrate includes an array substrate, an over coating covering the array substrate, and a color filter layer arranged on the over coating, wherein the color filter layer is provided with a first polarizing film layer.

As shown in FIG. 1, in such specific embodiment, the first substrate includes a base substrate 40, a reflection layer 41 arranged on the base substrate 40, an ITO layer 42 arranged on the reflection layer 41, a light guide film layer 43 coated on the ITO layer, a prism film layer 44 arranged on the light guide film layer 43, a diffusing film layer 45 arranged on the prism film layer 44, a second polarizing film layer 46 arranged on the diffusing film layer 45, and an alignment film layer (not shown in FIG. 1) arranged on the second polarizing film layer 46.

In which, an etching hole (not shown in FIG. 1) is formed at a position of a lattice point in the ITO layer 42 by a lattice mask of the light guide plate (LGP), a lattice structure is formed by the light guide film layer 43 in the etching hole of the ITO layer 42, and a surface of the light guide film layer 43 is flat.

The second polarizing film layer 46 has a polarizing angle matching with that of the first polarizing film layer.

The alignment film layer is aligned in accordance with a pretilt angle of a predetermined liquid crystal.

A light bar 47 is provided at a predetermined position of the base substrate 40.

When manufacturing the display screen according to the present embodiment, a liquid crystal are arranged on the first substrate and the second substrate, then the first substrate and the second substrate are arranged oppositely to form a cell, so as to form a liquid crystal display panel, an integrated circuit (IC) and a flexible circuit board are attached on the second substrate, after being given a signal, the liquid crystal display panel is turned on for display confirmation.

In FIG. 1, reference number 48 represents an edge protection layer, the edge protection layer 48 may be formed by: after a film layer is formed, etching of an edge part, coating, solidifying to form a protect layer. The edge protection layer is mainly used to protect an edge film layer, avoid damage and then prevent an influence on an optical effect of the film layer.

Figure 2:
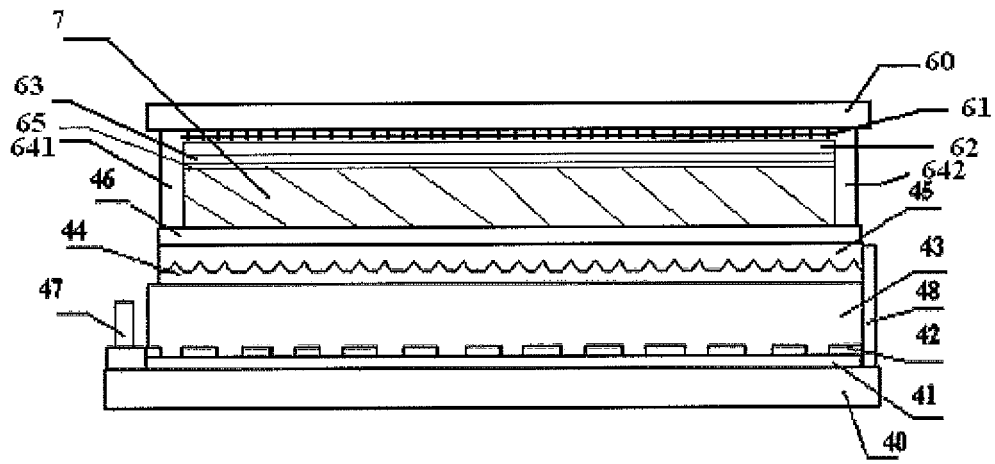
FIG. 2 is a schematic diagram showing a cross-section of a display screen according to an embodiment of the present disclosure.

FIG. 2 is a schematic diagram showing a cross-section of a display screen according to embodiments of the present disclosure. In FIG. 2, a reference number 60 represents a base substrate 60 included in the second substrate, a reference number 61 represents array wirings, a reference number 62 represents an over coating, a reference number 63 represents a color filter layer, reference numbers 641 and 642 represent resin frames, a reference number 65 represents a first polarizing film layer, a reference number 7 represents a liquid crystal layer; a surface of the first polarizing film layer 65 is provided with an alignment film layer (not shown in FIG. 2), and the alignment film layer is aligned in accordance with a pretilt angle of a predetermined liquid crystal; the first polarizing film layer 65 matches with the second polarizing film layer 46.

In the present embodiment, the first polarizing film layer 65 may also be replaced by a polaroid, just arranged on a different position, the base substrate has two sides: one side is provide with a color filter array film layer, the other side is attached with the polaroid after the cell is formed finally.

In the present embodiment, the first substrate is a back light substrate; the second substrate is a color filter array substrate.

In the display screen according to the present embodiment, a linear light source provided on the substrate is used as a light source, so as to form a back light substrate, the back light substrate and the color filter array substrate are arranged oppositely to form a cell, so as to form a liquid crystal panel. The integration of the back light unit and the liquid crystal panel is achieved, at the same time array wirings and color filter layer are located at same side, the array wirings are completed covered by the color film layer, and the scanning lines resulting from TFT characteristics changes during illumination can be avoided, the integral design may reduce the thickness of the integral module.

Figure 3:
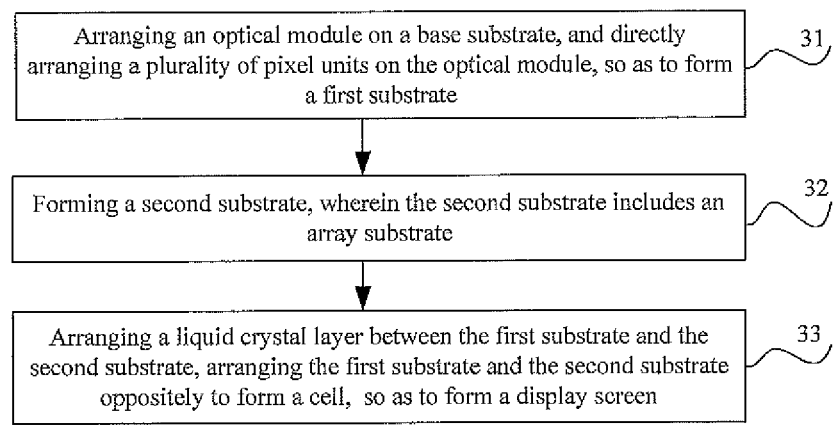
FIG. 3 is a flow chart showing a method for manufacturing a display screen according to an embodiment of the present disclosure.

As shown in FIG. 3, a method for manufacturing a display screen according to embodiments of the present disclosure includes:
a step for manufacturing a first substrate 31: arranging an optical module on a base substrate, directly arranging a plurality of pixel units on the optical module, so as to form the first substrate;
a step for manufacturing a second substrate 32: forming the second substrate, wherein the second substrate includes an array substrate;
a step for forming a cell 33: arranging a liquid crystal layer between the first substrate and the second substrate, arranging the first substrate and the second substrate oppositely to form the cell, so as to form the display screen.

In the method for manufacturing the display screen according to embodiments of the present disclosure, the optical module is provided on the substrate so as to form the first substrate (also known as the back light substrate), the second substrate which includes the array substrate is formed, and then the first substrate and the second substrate are oppositely arranged to form a cell, so as to form the display screen. The integration of the back light unit and the display panel is finally achieved, which reduce the thickness of the display module.

Specifically, the step for manufacturing the second substrate further includes:
covering an over coating on the array substrate;
arranging a color filter layer on the over coating.

Alternatively, the step for manufacturing the second substrate further includes: arranging a first polarizing film layer on the color filter layer.

The step for manufacturing the first substrate further includes: arranging a second polarizing film layer on the optical module, wherein the second polarizing film layer has a polarizing angle matching with that of the first polarizing film layer.

An alignment film layer is arranged on the second polarizing film layer, the alignment film layer is aligned in accordance to a pretilt angle of a predetermined liquid crystal.

Alternatively, in the step for manufacturing the first substrate, the step for arranging the optical module on the base substrate further includes:

arranging a light guide plate on the base substrate;
arranging a prism film layer on the light guide plate, wherein the prism film is provided with a ribbing by being exposed and developed; and
arranging a diffusing film layer on the prism film layer.

Alternatively, the step for arranging the light guide plate on the base substrate further includes:

forming a reflection layer on the base substrate;
forming an ITO (indium tin oxide) layer on the reflection layer, and etching the ITO layer at a position of a lattice point using a lattice mask of the light guide plate, to form an etching hole;
coating a light guide film layer on the ITO layer, so that a lattice structure is formed by the light guide film layer in the etching hole of the ITO layer, reserving a position where a linear light source attaches on a light incident side of the light guide film layer, flatting the surface of the light guide film layer by a laser treatment.

Alternatively, in the step for manufacturing the first substrate, the step for arranging the optical module on the base substrate further includes:

arranging a reflection layer on the base substrate;
arranging a lower electrode layer on the reflection layer, arranging a planar organic light emitting diode (OLED) light emitting layer on the lower electrode layer, arranging an upper electrode layer on the planar OLED light emitting layer;
arranging a prism film layer on the upper electrode layer, wherein the prism film layer is provided with a ribbing by being exposed and developed; and
arranging a diffusing layer on the prism film layer, forming an antireflection film layer on the diffusing film layer.

Figure 4:
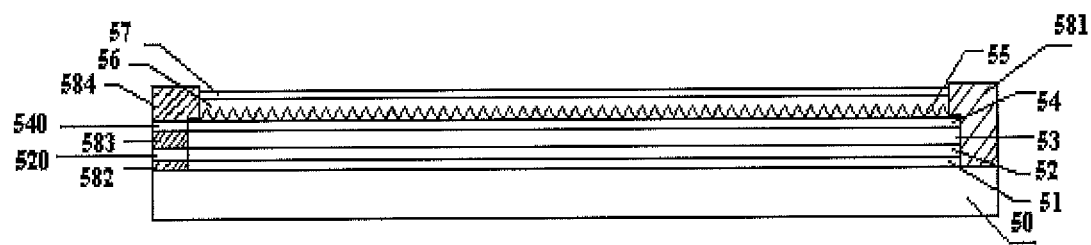
FIG. 4 is a schematic diagram showing a cross-section of a first substrate manufactured by a method for manufacturing a display screen according to an embodiment of the present disclosure.

As shown in FIG. 4, according to a specific embodiment, the step for manufacturing the first substrate specifically includes:

arranging a reflection layer 51 on the base substrate 50;
arranging a lower electrode layer 52 on the reflection layer 51, forming a planar OLED light emitting layer 53 on the lower electrode layer 52, arranging an upper electrode layer 54 on the planar OLED light emitting layer 53;
arranging a prism film layer 55 on the upper electrode layer 54, wherein the prism film is provided with a ribbing by being exposed and developed; and
arranging a diffusing layer 56 on the prism film layer 55, arranging an antireflection film layer 57 on the diffusing film layer 56.

In FIG. 4, reference numbers 581, 582, 583 and 584 represent resin frames, a reference number 520 represents a lower electrode line, a reference number 540 represents an upper electrode line.

In the method for manufacturing the display screen according to the present embodiment of the present disclosure, the planar OLED light emitting layer arranged on the substrate is used as a light source, the first substrate (also known as the back light substrate in the present embodiment) is formed, and the back light substrate and a color filter array substrate are arranged oppositely to form a cell so as to form a liquid crystal panel. The integration of the back light unit and the liquid crystal panel may be achieved, and in the liquid crystal display screen manufactured by the method for manufacturing the display screen according to embodiments of the present disclosure, array wirings and color filter layer are located at same side, the array wirings are completed covered by the color film layer, and the scanning lines resulting from TFT characteristics changes during illumination can be avoided, at the same time the integral design may reduce the thickness of the integral module.

Figure 5:
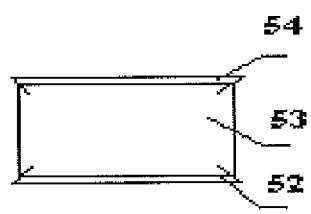
FIG. 5 is a schematic diagram showing the state of OLED light emitting layer 53 in FIG. 4 when a lower electrode layer 52 and an upper electrode 54 are powered.

FIG. 5 is a schematic diagram showing the state of OLED light emitting layer 53 in FIG. 4 when a lower electrode layer 52 and an upper electrode 54 are powered. In order to ensure uniformity of electric field, the power is supplied from four corners simultaneously.

The above are merely the preferred embodiments of the present disclosure. It should be noted that, a person skilled in the art may further make improvements and modifications without departing from the principle of the present disclosure, and these improvements and modifications shall also be considered as the scope of the present disclosure.

What is claimed is:

1. A display screen, comprising a first substrate, a second substrate and a liquid crystal layer arranged between the first substrate and the second substrate;

wherein the first substrate comprises a base substrate, an optical module arranged on the base substrate, and a plurality of pixel units directly arranged on the optical module;

the second substrate comprises an array substrate;
wherein the optical module comprises:
a light guide plate arranged on the base substrate;
a prism film layer arranged on the light guide plate, wherein the prism film layer is provided with a ribbing; and
a diffusing film layer arranged on the prism film layer;
wherein the light guide plate comprises:
a reflection layer formed on the base substrate;
an indium tin oxide (ITO) layer formed on the reflection layer, wherein an etching hole is formed at a position of a lattice point in the ITO layer; and
a light guide film layer coated on the ITO layer, wherein a lattice structure is formed by the light guide film layer in the etching hole of the ITO layer, and the light guide film layer has a flat surface.

2. The display screen according to claim 1, wherein the second substrate further comprises an over coating covering the array substrate, and a color filter layer arranged on the over coating.

3. The display screen according to claim 2, wherein a first polarizing film layer is arranged on the color filter layer.

4. The display screen according to claim 3, wherein the first substrate further comprises:

a second polarizing film layer arranged on the optical module, wherein the second polarizing film layer has a polarizing angle matching with that of the first polarizing film layer.

5. The display screen according to claim 4, wherein the first substrate further comprises:

an alignment film layer arranged on the second polarizing film layer, wherein the alignment film layer is aligned in accordance with a pretilt angle of a predetermined liquid crystal.

6. The display screen according to claim 1, wherein the optical module comprises:
a reflection layer arranged on the base substrate;
a lower electrode layer arranged on the reflection layer;
a planar organic light emitting diode (OLED) light emitting layer arranged on the lower electrode layer;
an upper electrode layer arranged on the planar OLED light emitting layer;
a prism film layer arranged on the upper electrode layer, wherein the prism film layer is provided with a ribbing;
a diffusing film layer arranged on the prism film layer; and
an antireflection film layer arranged on the diffusing film layer.

7. The display screen according to claim 1, wherein a light bar is provided at a predetermined position of the base substrate.

8. The display screen according to claim 1, wherein the ITO layer is arranged between the liquid crystal layer and the light guide plate.

9. A method for manufacturing a display screen, comprising:
a step of manufacturing a first substrate: arranging an optical module on a base substrate, and directly arranging a plurality of pixel units on the optical module, so as to form the first substrate;
a step of manufacturing a second substrate: forming the second substrate, wherein the second substrate comprises an array substrate; and
a step of forming a cell: arranging a liquid crystal layer between the first substrate and the second substrate, and arranging the first substrate and the second substrate oppositely to form the cell, so as to form the display screen;
wherein in the step of manufacturing the first substrate, the step of arranging the optical module on the base substrate further comprises:
arranging a light guide plate on the base substrate;
arranging a prism film layer on the light guide plate, wherein the prism film is provided with a ribbing by being exposed and developed; and
arranging a diffusing film layer on the prism film layer;
wherein the step of arranging the light guide plate on the base substrate further comprises:
forming a reflection layer on the base substrate;
forming an ITO layer on the reflection layer, and etching the ITO layer at a position of a lattice point using a lattice mask of the light guide plate, to form an etching hole;
coating a light guide film layer on the ITO layer so that a lattice structure is formed by the light guide film layer in the etching hole of the ITO layer, reserving a position where a linear light source is attached on a light incident side of the light guide film layer, and flatting the surface of the light guide film layer by laser treatment.

10. The method according to claim 9, wherein the step of manufacturing the second substrate further comprises:
covering the array substrate with an over coating; and
arranging a color filter layer on the over coating.

11. The method according to claim 10, wherein the step of manufacturing the second substrate further comprises:
arranging a first polarizing film layer on the color filter layer.

12. The method according to claim 11, wherein in the step of manufacturing the first substrate, a light bar is provided at a predetermined position of the base substrate.

13. The method according to claim 10, wherein the step of manufacturing the first substrate further comprises:
arranging a second polarizing film layer on the optical module, wherein the second polarizing film layer has a polarizing angle matching with that of the first polarizing film layer.

14. The method according to claim 13, wherein the step of manufacturing the first substrate further comprises:
arranging an alignment film layer on the second polarizing film layer, and aligning the alignment film layer in accordance with a pretilt angle of a predetermined liquid crystal.

15. The method according to claim 10, wherein in the step of manufacturing the first substrate, a light bar is provided at a predetermined position of the base substrate.

16. The method according to claim 9, wherein in the step of manufacturing the first substrate, the step of arranging the optical module on the base substrate further comprises:
arranging a reflection layer on the base substrate;
arranging a lower electrode layer on the reflection layer;
arranging a planar organic light emitting diode (OLED) light emitting layer on the lower electrode layer;
arranging an upper electrode layer on the planar OLED light emitting layer;
arranging a prism film layer on the upper electrode layer, wherein the prism film layer is provided with a ribbing by being exposed and developed;
arranging a diffusing layer on the prism film layer; and
arranging an antireflection film layer on the diffusing film layer.

17. The method according to claim 9, wherein in the step of manufacturing the first substrate, a light bar is provided at a predetermined position of the base substrate.

* * * * *